(12) United States Patent
Newlon et al.

(10) Patent No.: US 9,097,341 B2
(45) Date of Patent: Aug. 4, 2015

(54) BRAKE SYSTEM HAVING A BRAKE CAPACITY TEST MODE FOR A MACHINE HAVING A HYDROSTATIC DRIVETRAIN

(75) Inventors: Lucas Micah Newlon, Raleigh, NC (US); Bradley John Will, Peoria, IL (US); Sudarshan Aravamuthan Maiyur, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 630 days.

(21) Appl. No.: 13/359,251

(22) Filed: Jan. 26, 2012

(65) Prior Publication Data

US 2013/0192918 A1    Aug. 1, 2013

(51) Int. Cl.
*B60K 17/10*    (2006.01)
*F16H 61/47*    (2010.01)
*F16H 59/68*    (2006.01)
*F16H 61/12*    (2010.01)
*G01L 5/28*    (2006.01)

(52) U.S. Cl.
CPC ............... *F16H 61/47* (2013.01); *F16H 61/12* (2013.01); *B60K 17/10* (2013.01); *B60Y 2200/415* (2013.01); *F16H 2059/6861* (2013.01); *F16H 2059/6876* (2013.01); *F16H 2061/1208* (2013.01); *G01L 5/28* (2013.01)

(58) Field of Classification Search
CPC ............ B60W 10/06; B60W 2540/10; B60W 30/18136; B60K 2741/165; B60K 2741/26; B60K 31/10; B60K 41/162; E02F 9/2246; E02F 9/2253; E02F 9/2228; F16H 61/4157
USPC .......................................... 180/305, 306, 307
See application file for complete search history.

(56) References Cited

U.S. PATENT DOCUMENTS

| 3,734,225 | A | * | 5/1973 | Kobald et al. | 180/307 |
|---|---|---|---|---|---|
| 3,746,115 | A | * | 7/1973 | Bosch | 180/307 |
| 7,273,124 | B2 | * | 9/2007 | Tatsuno et al. | 180/305 |
| 7,841,442 | B2 | * | 11/2010 | Berg et al. | 180/305 |
| 7,886,862 | B2 | * | 2/2011 | Tatsuno et al. | 180/306 |
| 8,286,748 | B2 | * | 10/2012 | Takahashi et al. | 180/307 |
| 2004/0046443 | A1 | | 3/2004 | Jensen et al. | |
| 2005/0067895 | A1 | | 3/2005 | Marathe | |
| 2006/0191732 | A1 | | 8/2006 | Lunzman et al. | |
| 2009/0235655 | A1 | | 9/2009 | Koehler et al. | |
| 2010/0154626 | A1 | | 6/2010 | Nelson et al. | |
| 2011/0295473 | A1 | | 12/2011 | DeMarco et al. | |

* cited by examiner

*Primary Examiner* — J. Allen Shriver, II
*Assistant Examiner* — Bridget Avery
(74) *Attorney, Agent, or Firm* — Miller, Matthias & Hull LLP

(57) ABSTRACT

A brake system and method includes a test mode for determining a capacity of the brake system provided on a machine having a hydrostatic drive. A hydrostatic drive target differential pressure range is determined to simulate a test torque. A machine ground speed limit, hydrostatic drive actual differential pressure, and actual ground speed of the machine are determined. An output pressure of the hydrostatic pump is modulated to drive the hydrostatic drive actual differential pressure toward the hydrostatic drive target differential pressure range. A first test fault condition is determined when the actual ground speed exceeds the machine ground speed limit. A second test fault condition is determined when the hydrostatic drive actual differential pressure is outside the hydrostatic drive target differential pressure range.

15 Claims, 4 Drawing Sheets

US 9,097,341 B2

BRAKE SYSTEM HAVING A BRAKE CAPACITY TEST MODE FOR A MACHINE HAVING A HYDROSTATIC DRIVETRAIN

TECHNICAL FIELD

The present disclosure generally relates brake systems, and more particularly to brake systems for machines having hydrostatic drives.

BACKGROUND

Brake systems for machines are generally known. Machines, such as wheel loaders, backhoe loaders, on-highway trucks, and off-highway trucks, have a number of wheels typically mounted in pairs on axles. Such machines also have a brake system which may include a service brake and a parking brake. The service brake, such as a drum brake, disc brake, or other known type, is associated with at least one wheel or axle to slow or stop a traveling machine. The parking brake, also of a known type, is associated with at least one wheel or axle to hold a stopped machine in position. Controls for the service and parking brakes are typically provided in a cab of the machine.

It is common for an operator to test the brake capacity of the service and/or parking brake prior to or during use of the machine. For example, the capacity of the service brake may be tested to ensure that the machine can safely stop when in motion in a variety of typical travel conditions and terrains. Similarly, the capacity of the parking brake may be tested to ensure that the machine can be safely held in place on almost any terrain.

In machines having a mechanical drivetrain, brake holding capacity can be tested by placing the drivetrain in a low torque mode. The mechanical drivetrain typically includes a transmission and torque converter so that higher gears may produce lower torque. Accordingly, when the transmission is placed in a high gear, typically third or fourth gear for many machines, it may produce a lower torque. To test brake capacity, the operator may engage either the service brake or the parking brake, place the transmission in a higher gear, and attempt to drive through the applied brake. If the brake holds the machine in place during this test, it may indicate that the brake capacity is sufficient for most operating conditions. With this method, however, it is difficult to accurately test the brake capacity as the higher gears may still produce a torque that exceeds test requirements.

A similar brake test is not possible for some machines having a hydrostatic drive. These machines have hydrostatic drives that produce full torque in all ranges, and therefore it is not possible to place them in a low torque condition by shifting into a higher gear. Additionally, while other machines may have hydrostatic drives capable of operating in a lower torque condition, brake capacity testing of those machines suffers from the same imprecision as the mechanical drivetrain test noted above.

SUMMARY OF THE DISCLOSURE

In accordance with one aspect of the disclosure, a method is provided for performing a brake capacity test on a brake system provided on a machine having a hydrostatic drive with a hydrostatic pump. The method includes determining a hydrostatic drive target differential pressure range, determining a machine ground speed limit, determining a hydrostatic drive actual differential pressure, and determining an actual ground speed of the machine. An output pressure of the hydrostatic pump is modulated to drive the hydrostatic drive actual differential pressure toward the hydrostatic drive target differential pressure range. A first test fault condition is determined when the actual ground speed exceeds the machine ground speed limit. A second test fault condition is determined when the hydrostatic drive actual differential pressure is outside the hydrostatic drive target differential pressure range.

In another aspect of the disclosure that may be combined with any of these aspects, a machine is provided that includes a machine body, a traction device coupled to the machine body, and a hydrostatic drive mounted on the machine body. The hydrostatic drive includes a hydrostatic pump, a hydrostatic motor hydraulically coupled to the hydrostatic pump and operatively coupled to the fraction device, a forward line fluidly communicating from an outlet of the hydrostatic pump to an inlet of the hydrostatic motor, a reverse line fluidly communicating from the outlet of the hydrostatic motor to an inlet of the hydrostatic pump, and hydraulic oil having an forward line oil pressure and a reverse line oil pressure. A brake system is associated with the traction device and a controller is operatively coupled to the brake system, the controller being configured to perform a brake capacity test routine including determining a hydrostatic drive target differential pressure range, determining a machine ground speed limit, determining a hydrostatic drive actual differential pressure based on the forward line oil pressure and the reverse line oil pressure, determining an actual ground speed of the machine, modulating an output pressure of the hydrostatic pump to drive the hydrostatic drive actual differential pressure toward the hydrostatic drive target differential pressure range, determining a first test fault condition when the actual ground speed exceeds the machine ground speed limit, and determining a second test fault condition when the hydrostatic drive actual differential pressure is outside the hydrostatic drive target differential pressure range.

In another aspect of the disclosure that may be combined with any of these aspects, a timer may be initiated for measuring a test period, and a test pass condition may be determined when the hydrostatic drive actual differential pressure is maintained within the hydrostatic drive target differential pressure range during the test period.

In another aspect of the disclosure that may be combined with any of these aspects, a timer may be initiated for measuring a test period, and a third test fault condition may be determined when the hydrostatic drive actual differential pressure fails to reach the hydrostatic drive target differential pressure range within the test period.

In another aspect of the disclosure that may be combined with any of these aspects, a hydrostatic drive maximum differential pressure greater than the hydrostatic drive target differential pressure range may be determined, and the output pressure may be decreased when the hydrostatic drive actual differential pressure exceeds the hydrostatic drive maximum differential pressure.

In another aspect of the disclosure that may be combined with any of these aspects, the hydrostatic drive may include a forward line fluidly communicating with an outlet of the hydrostatic pump and a reverse line fluidly communicating with an inlet of the hydrostatic pump, and the hydrostatic drive actual differential pressure may be determined by comparing a forward pressure in the forward line with a reverse pressure in the reverse line.

In another aspect of the disclosure that may be combined with any of these aspects, the machine may include an engine operating at an engine speed, a minimum engine speed may be determined, an actual engine speed may be determined, and the brake capacity test may be exited when the actual engine speed is less than the minimum engine speed.

In another aspect of the disclosure that may be combined with any of these aspects, the hydrostatic drive may include a hydraulic oil having an oil temperature, a minimum oil temperature may be determined, an actual oil temperature may be determined, and the brake capacity test may be exited when the actual oil temperature is less than the minimum oil temperature.

In another aspect of the disclosure that may be combined with any of these aspects, the hydrostatic drive may include a selector movable between a neutral position and a non-neutral position, and the brake capacity test may be initiated only when the selector is in the non-neutral position.

In another aspect of the disclosure that may be combined with any of these aspects, the brake capacity test may be exited when the selector is moved from the non-neutral position to the neutral position.

In another aspect of the disclosure that may be combined with any of these aspects, the brake system may include a service brake having a service brake control movable between a released position and an actuated position, the method further comprising determining a position of the service brake control, initiating the brake capacity test only when the service brake control is in the actuated position, and exiting the brake capacity test when the service brake control is in the released position.

In another aspect of the disclosure that may be combined with any of these aspects, the machine may include a second brake system comprising a parking brake having a parking brake control movable between a released position and an actuated position, the method further comprising determining a position of the parking brake control, initiating the brake capacity test only when the parking brake control is in the released position, and exiting the brake capacity test when the parking brake control is in the actuated position.

In another aspect of the disclosure that may be combined with any of these aspects, the brake system may include a parking brake having a parking brake control movable between a released position and an actuated position, the method further comprising determining a position of the parking brake control, initiating the brake capacity test only when the parking brake control is in the actuated position, and exiting the brake capacity test when the parking brake control is in the released position.

In another aspect of the disclosure that may be combined with any of these aspects, the machine may include a second brake system comprising a service brake having a service brake control movable between a released position and an actuated position, the method further comprising determining a position of the service brake control, initiating the brake capacity test only when the service brake control is in the released position, and exiting the brake capacity test when the service brake control is in the actuated position.

In another aspect of the disclosure that may be combined with any of these aspects, the hydrostatic drive target differential pressure range may be based on a test torque associated with the machine.

In another aspect of the disclosure that may be combined with any of these aspects, the test torque may be based a mass of the machine and test conditions identified in ISO 3450.

DETAILED DESCRIPTION

Embodiments of brake systems are disclosed for use with machines having hydrostatic drives. The brake systems are configured to run a capacity test to ensure that the brake system can safely stop a moving machine or hold a stationary machine in place. Prior to or during the test, a test torque is determined that simulates the amount of torque the brakes should be able to hold the machine against under assumed test conditions, and a hydrostatic drive target differential pressure range is determined that simulates the test torque. During the test, an actual ground speed of the machine is monitored and an actual differential pressure of the hydrostatic drive is determined. The hydrostatic drive pump pressure is commanded to increase. If the actual ground speed exceeds a ground speed limit at any time during the test, the brake system may fail the test. If the actual differential pressure reaches the target differential pressure and is maintained within range for a set period of time, the brake system may pass the test. Additionally, the test may identify whether the machine reached sufficient test conditions and may immediately exit the test if in response to certain inputs or feedback. Still further, the test provides a more accurate indication of brake capacity.

Figure 1:
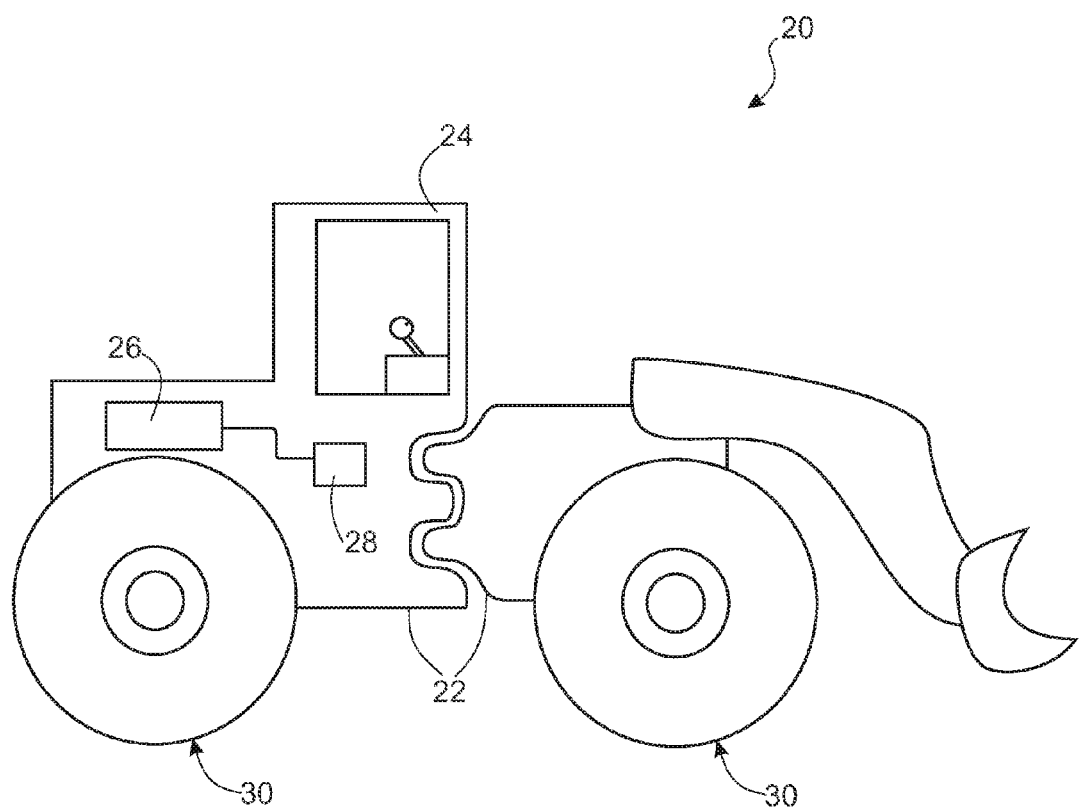
FIG. 1 is a diagrammatic illustration of a machine according to an exemplary disclosed embodiment.

FIG. 1 illustrates a machine 20 incorporating a brake system. The machine 20 includes a body 22 with an operator cab 24. The body also supports an power source 26 operably coupled to a hydrostatic drive 28. Traction devices, such as wheels 30, may be operably coupled to the hydrostatic drive 28. While wheels 30 are shown in the exemplary embodiment, belts, tracks, or other traction devices may be used.

While the machine 20 is illustrated in FIG. 1 as a wheel loader, the machine 20 may be any type of machine having, or capable of having, a hydrostatic drive. For example, in addition to wheel loaders, machine 20 may include other types of wheeled or tracked machines such as backhoe loaders, forklifts, paving machines, off-highway trucks, and on-highway trucks (such as dump trucks, semi trucks, and passenger vehicles).

The machine 20 may include more than one hydrostatic drive 28. The machine 20 may include a separate drive 28 for each wheel 30. For example, a wheel loader may include either a single drive 28, which drives a pair of wheels 30, or it may include a separate drive 28 for two or more of the four wheels 30.

The power source 26 may include an engine, such as, for example, a diesel engine, a gasoline engine, a natural gas engine, a hydrogen engine, or any other engine apparent to one skilled in the art. The power source 26 may also include other sources of power such as a fuel cell, a power storage device, or any other source of power known in the art.

Figure 2:
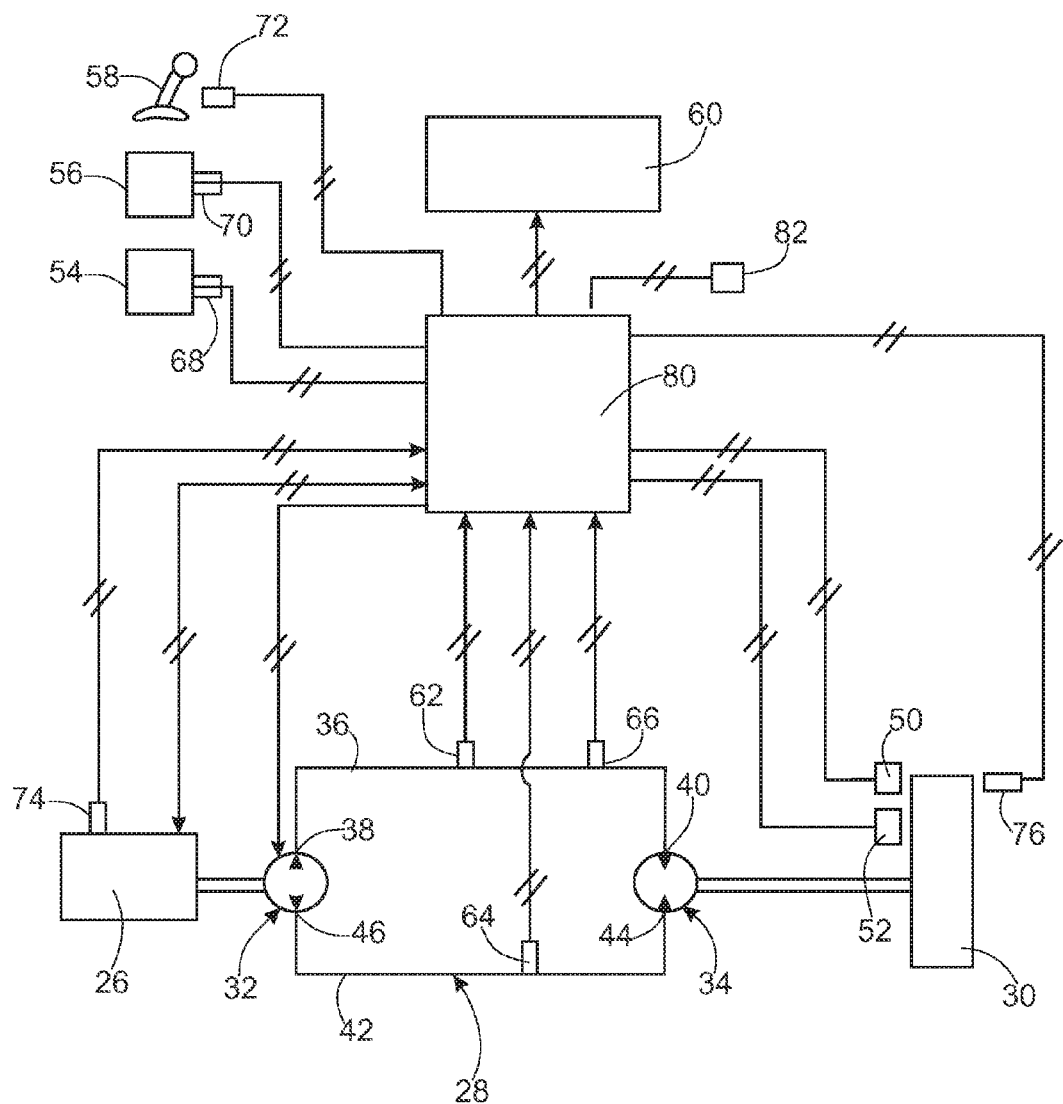
FIG. 2 is a diagrammatic illustration of a hydrostatic drive and brake system according to an exemplary disclosed embodiment.

As best shown in FIG. 2, the hydrostatic drive 28 may include a hydrostatic pump 32 operably coupled to the power source 26 and a hydrostatic motor 34 operably coupled to the wheel 30. The pump 32 and motor 34 are fluidly coupled by hydraulic lines. For example, a forward line 36 may extend from an outlet 38 of the pump 32 to an inlet 40 of the motor 34. Additionally, a reverse line 42 may extend from an outlet 44 of the motor 34 to an inlet 46 of the pump 32. The power source 26 operates the pump 32 to generate a forward pressure in the forward line 36, which in turn operates the motor 34. Hydraulic oil is returned to the pump through the reverse line 42.

A service brake 50 is associated with a wheel 30 for applying a brake force to slow down or stop a traveling machine 20. A parking brake 52 is also associated with a wheel 30 for holding in place a stopped machine 20. While the service brake 50 and parking brake 52 are shown in FIG. 2 as associated with the same wheel 30, they may alternatively be associated with different wheels 30. Both the service brake 50 and parking brake 52 may be configured for hydraulic operation.

A plurality of user-engageable controls may be provided in the cab 24. These controls may include a service brake control 54 operably coupled to the service brake 50 and movable between a released position (in which the service brake 50 is disengaged) and an actuated position (in which the service brake 50 is engaged). The actuated position may correspond to the service brake control 54 being depressed by a certain percentage of full travel, such as 95%. A parking brake control 56 may also be provided that is operably coupled to the parking brake 52. The parking brake control 56 may also be movable between a released position (in which the parking brake 52 is disengaged) and an actuated position (in which the parking brake 52 is engaged). A drive selector 58 may be operably coupled to the hydrostatic drive 28 to permit shifting between one or more forward speed ranges, neutral, and one or more reverse speed ranges. Accordingly, the drive selector 58 has a neutral position and a plurality of non-neutral positions (which may include one or more forward speed range positions and one or more reverse speed range positions). The cab 24 may further include a display 60 for providing visual information to the operator.

The machine 20 may include various sensors for providing feedback regarding the machine 20. As best shown in FIG. 2, a forward line pressure sensor 62 is associated with the forward line 36 and configured to detect hydraulic oil pressure in the forward line 36. A reverse line pressure sensor 64 may be associated with the reverse line 42 and configured to detect hydraulic oil pressure in the reverse line 42. An oil temperature sensor 66 may be associated with the hydrostatic drive 28 and configured to detect a temperature of the hydraulic oil. A service brake control sensor 68 may be associated with the service brake 50 to detect whether the service brake 50 is in the released or actuated positions. A parking brake control sensor 70 may be associated with the parking brake control 56 to detect whether the parking brake control 56 is in the released or actuated positions. A drive selector sensor 72 may be associated with the drive selector 58 to detect whether the drive selector 58 is in the neutral or non-neutral positions. An engine speed sensor 74 may be associated with the power source 26 to determine an engine speed. A ground speed sensor 76 may be provided to detect a ground speed of the machine 20 either directly or by inference, such as by measuring rotational speed of the hydrostatic motor 32. While the above sensors are shown in FIG. 2 as being located in specific positions relative to their associated components, they may be placed in alternative locations. Furthermore, additional or different sensor than those shown herein may be used. Still further, the feedback provided by one or more of the sensors may be inferred from other sensors or sources of feedback, and therefore a separate sensor to provide that feedback would not be needed.

The machine 20 may further include a controller, such as an electronic control module (ECM) 80. The ECM 80 may include any components that may be sued to run an application such as, for example, a memory, a secondary storage device, and a central processing unit. The ECM 80 may, however, contain additional or different components such as, for example, mechanical or hydromechanical devices. Various other known circuits may be associated with the ECM 80 such as, for example, power supply circuitry, signal-conditioning circuitry, solenoid driver circuitry, and other appropriate circuitry. While the ECM 80 is shown in FIG. 2 as a single controller connected, multiple controllers may be used.

The ECM 80 may be configured to receive input information from the various sensors and input devices discussed above. ECM 80 may further be configured to generate control signals for operation of pump 32, motor 34, power source 26, service brake 50 and parking brake 52. The ECM 80 may generate the control signals based on information received from the forward line pressure sensor 62, reverse line pressure sensor 64, oil temperature sensor 66, service brake control sensor 68, parking brake control sensor 70, drive selector sensor 72, engine speed sensor 74, and ground speed sensor 76. The ECM 80 may be in communication with the power source 26, pump 32, motor 34, service brake 50, parking brake 52, and display 60 through control lines, which may carry digital, analog, or mixed types of signals. Alternatively, communication with the various components may be implemented by means of wireless, mechanical, or hydraulic lines.

The ECM 80 may be configured to execute a brake capacity test. The brake capacity test may be used to assess the brake capacity of either the service brake 50 or the parking brake 52. The ECM 80 may be programmed to execute the steps associated with the test, such as by storing a routine in the memory of the ECM 80.

Figure 3:
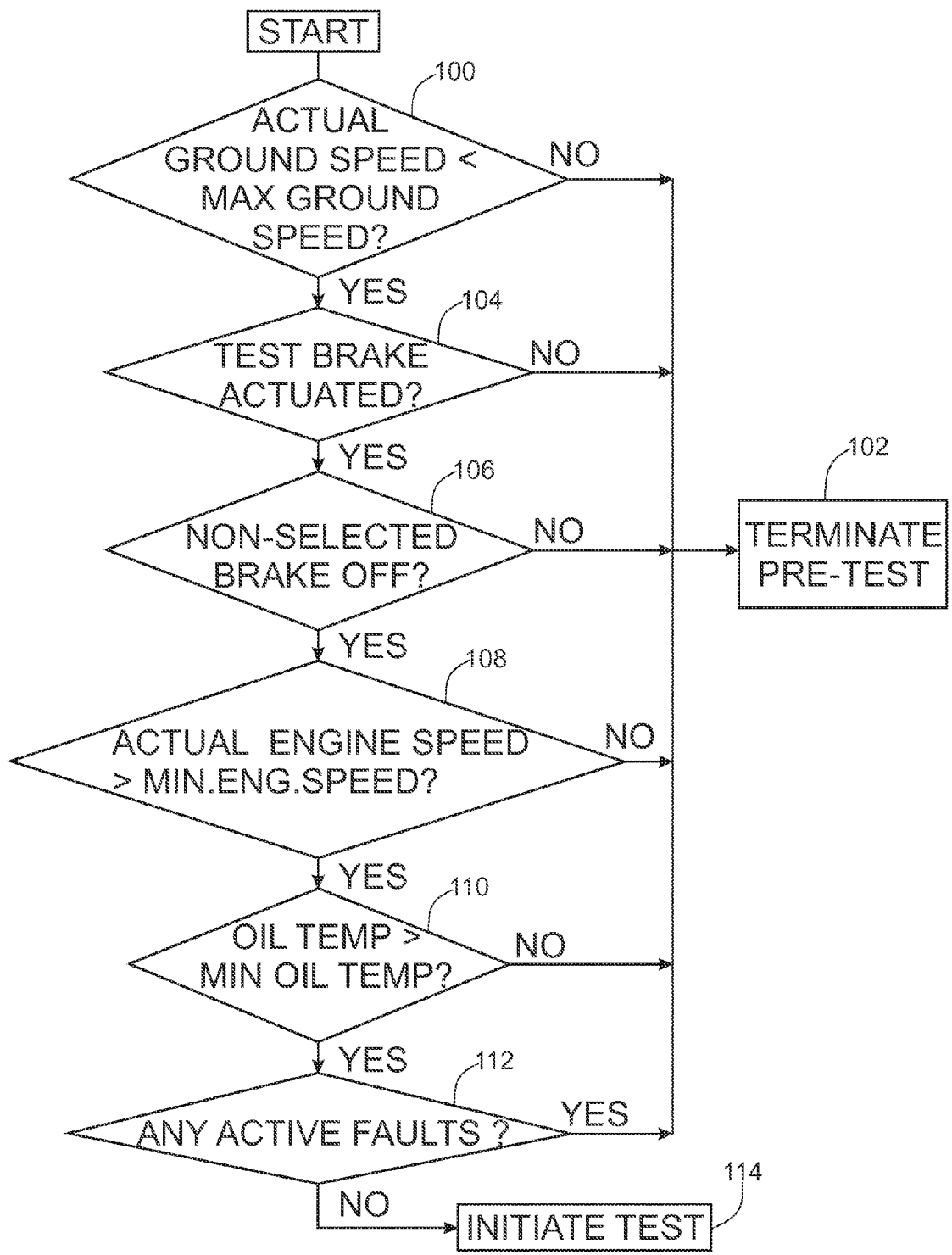
FIG. 3 is a flowchart representation of control logic of the brake system according to an exemplary disclosed embodiment.

FIG. 3 is a flow chart illustrating a pre-test for checking the operating conditions prior to initiating the brake capacity test. Accordingly, at step 100, the pre-test routine may begin by determining whether an actual ground speed is less than a maximum allowable ground speed limit. The maximum allowable ground speed limit may be set at any suitable value that permits slight movement of the machine 20 during the test, such as one kilometer per hour. If the actual ground speed exceeds the maximum allowable ground speed limit, then the routine proceeds to step 102 where the pre-test is terminated and the brake capacity test is prevented from starting.

Otherwise, the routine proceeds to steps 104 and 106 where the ECM 80 determines if the test brake control is in the actuated position and the non-selected brake is in the released position. As used herein, the "test brake" is the brake selected for testing, with the other brake being the "non-selected brake." Accordingly, if the service brake is being tested, step 104 may determine whether the service brake is in the actuated position, while step 106 may determine whether the parking brake is in the released position. Conversely, when the parking brake is being tested, step 104 may determine whether the parking brake is in the actuated position while step 106 may determine whether the service brake is in the released position. If either of steps 104 and 106 result in the negative, the routine proceeds to step 102 and the pre-test is terminated. Otherwise, the routine may proceed to the next step.

At step 108, ECM 80 may determine whether an actual engine speed is greater than a minimum engine speed. The minimum engine speed may be selected such that it is capable of operating the pump 32 to output the desired pressure. For example, the minimum engine speed may be 1700 rpm for certain machines. If the actual engine speed is less than the minimum engine speed, the routine proceeds to step 102 and the pre-test is terminated.

At step 110, the ECM 80 may determine whether the actual oil temperature is greater than a minimum oil temperature. The minimum oil temperature may be selected to avoid initiating a brake capacity test during a cold startup of the machine 20. For example, a minimum oil temperature of 15° C. may be selected for certain machines. If the actual oil temperature is less than the minimum oil temperature, the routine proceeds to step 102 and the pre-test is terminated.

At step 112, the ECM 80 checks for any other positive fault conditions. Other routines executed by the ECM 80 may generate indications of fault conditions that may affect the systems used during the brake capacity test. If one or more fault conditions are still active, the routine may proceed to step 102 and terminate the pre-test. If no faults are active, the routine may proceed to block 114 and initiate the brake capacity test.

Figure 4:
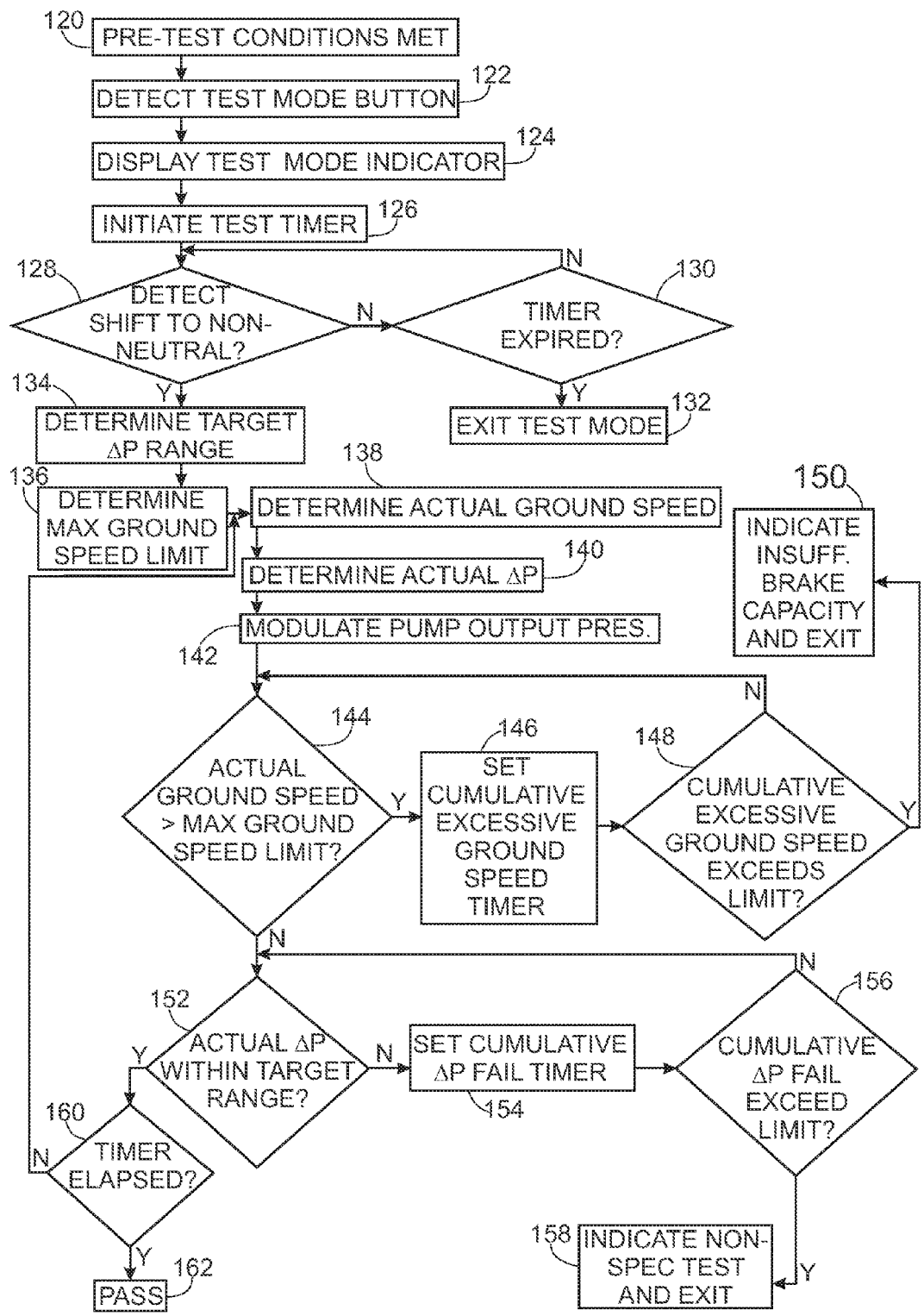
FIG. 4 is a flowchart representation of control logic of the brake system according to an exemplary disclosed embodiment.

FIG. 4 is a flow chart illustrating an embodiment of the brake capacity test routine. At step 120, the ECM 80 confirms that one or more of the pre-test conditions identified in FIG. 3 have been met. At step 122, the ECM 80 detects actuation of a test mode button 82 (FIG. 2) provided in the cab 24. The test mode button 82 may be configured to toggle between multiple functions (such as between parking brake test mode and service brake test mode), in which case the ECM 80 may confirm that the button 82 is actuated for the specified time to enter the test mode. At step 124, the ECM 80 may display an indication on the display 60 that communicates to the operator that the test mode is active. The indication may be text, an icon, or other indicator. At step 126, the ECM 80 initiates a timer to measure a test period.

At step 128, the ECM 80 determines whether the drive selector 58 has been shifted to the non-neutral position. If no shift is detected, the ECM 80 may check whether the timer has expired at step 130. If the timer has expired, the ECM 80 may exit the test mode at step 132. If the timer is still running, the ECM 80 may return to step 128 to await shifting of the drive selector 58 to a non-neutral position.

Once the drive selector 58 is moved to a non-neutral position, the ECM may determine a hydrostatic drive target differential pressure range at step 134. The target differential pressure range may simulate a test torque based on applicable testing criteria. For example, the test torque may be based on a mass of the machine and a given set of operating conditions. Exemplary operating conditions may be selected based on industry standards, such the standards identified for earth moving equipment published in ISO 3450:2011. For testing of service brakes, ISO 3450:2011 indicates that the brakes should be capable of holding against a torque based on a rollover protection system (ROPS) weight of the machine and a 25% grade. For parking brakes, ISO 3450:2011 indicates that the brakes should be capable of holding against a torque based on the ROPS weight of the machine and a 20% grade. The test torque, therefore, represents the minimum amount of torque that the brake must hold against to pass the selected test criteria. The hydrostatic drive 28 may be operated at a target differential pressure to simulate the test torque. To accommodate performance fluctuations in the hydrostatic drive 28 or other machine components, and/or to improve control loop stability, a range of differential pressures may be used. For example, for machines having a service brake test torque of approximately 1720 to 1930 Nm, the target differential pressure may be approximately 190 bar and the range may be approximately 180-200 bar (representing 190 bar, plus or minus 10 bar). Additionally, the parking brake test torque for the same machines may be approximately 1390-1560 Nm, in which case the target differential pressure range may be approximately 145-165 bar (representing a 155 bar target, plus or minus 10 bar). The hydrostatic drive target differential pressure range may be determined prior to operation of the machine based on standard operating conditions as noted above, or alternatively may be determined during operation of the machine based on the current operating conditions.

At step 136, the ECM 80 determines a maximum allowable ground speed limit for the machine 20. The maximum allowable ground speed limit may be set at a speed above which would indicate failed brake capacity while still permitting an inconsequential amount of machine movement, such as one kilometer per hour. At step 138, the ECM 80 determines an actual machine ground speed, which may be based on information provided by the ground speed sensor 76. At step 140, the ECM 80 determines a hydrostatic drive actual differential pressure, which may be based on information provided by the forward line pressure sensor 62 and the reverse line pressure sensor 64.

At step 142, the ECM 80 may modulate an output pressure of the hydrostatic pump 32 to drive the hydrostatic drive actual differential pressure toward the hydrostatic drive target differential pressure. For most application, during this step the ECM 80 may ramp up output pressure of the pump 32 until the actual differential pressure is within the target differential pressure range.

At step 144, the ECM 80 may determine whether the actual machine ground speed from step 138 exceeds the maximum allowable ground speed limit from step 136. A machine ground speed above the maximum allowable ground speed limit may indicate that the brake system is deficient. In the exemplary embodiment, if the actual ground speed is greater than the allowable ground speed limit, a timer is set at step 146 to track the amount of time the machine 20 has excessive ground speed. At step 148, the cumulative amount of excessive ground speed time is compared to a ground speed time limit. If the ground speed time limit is exceeded, the ECM 80 at step 150 may signal a test fault condition indicating that the brake system has insufficient capacity, and may exit the test mode. If the ground speed time limit is not exceeded, then ECM 80 may return to step 144.

If the actual machine ground speed does not exceed the maximum allowable ground speed limit, the ECM 80 at step 152 may determine whether the actual differential pressure from step 140 is within the target differential pressure range from step 134. In the exemplary embodiment, if the actual differential pressure is outside of the target differential pressure range, a timer is set at step 154 to track the amount of time the hydrostatic drive 28 is operating outside of the target range. At step 156, the cumulative amount of time operating outside of the target range is compared to an outside target range time limit. If the outside target range time limit is exceeded, the ECM 80 at step 158 may signal a test fault condition indicating that the test is not within specification, and may exit the test mode. If the outside target range time limit is not exceeded, then ECM 80 may return to step 152.

It will be appreciated that the actual differential pressure may fail step 152 by being either less than or greater than the target range. When the actual differential pressure is less than the target range, that may indicate a leak or other problem in the hydrostatic drive 28 or related systems that prevents the drive from achieving the desired target differential pressure range. When this occurs, the lower actual differential pressure simulates a torque that is less than the desired test torque. Consequently, the results of the test will not indicate whether the brake system has sufficient capacity to meet the desired testing standards.

On the other hand, a pressure exceeding the target differential pressure range may present other issues. While an excessive differential pressure will simulate a torque that is greater than the test torque, the excessive differential pressure increases the possibility of the machine 20 driving through the brakes and/or creating an unstable control condition. Accordingly, the ECM 80 may be programmed to reduce hydrostatic pump output pressure and/or exit the test mode when the actual differential pressure exceeds a maximum differential pressure limit. The maximum differential pressure limit may be determined relative to the target differential pressure. For example, the maximum differential pressure limit may be a set amount, such as 20 bar, above the target differential pressure.

If the actual differential pressure is within the target differential pressure range, at step 160 the ECM 80 may determine whether the test period has elapsed. If the test period has elapsed, the ECM 80 may proceed to step 162 and indicate a pass condition. Alternatively, if the test period has not elapsed, the ECM 80 may return to determine the actual machine ground speed and repeat steps 138 through 160 until a fault or pass condition is determined, or the test is otherwise terminated such as by failure to maintain the conditions established in the pre-test illustrated in FIG. 3.

The ECM 80 may further be programmed to exit the test mode due to a change in operating conditions. Generally, any of the conditions identified in the pre-test illustrated in FIG. 3 may be required to be maintained during the entire brake capacity test. In addition, the ECM 80 may exit the test mode if the position of the drive selector 58 is changed. Additionally, the test mode button 82 may be actuated to turn off the test mode.

Industrial Applicability

The present disclosure is applicable to a machine having a hydrostatic drive. The brake system for the machine may include a controller configured to execute a brake capacity test. The test uses a target differential pressure in the hydrostatic drive that simulates a test torque. The test torque, in turn, may be based on industry standards for testing brake systems, such as ISO 3450:2011. Furthermore, by providing a brake test method that uses a hydrostatic differential pressure to simulate a test torque, the test may be quickly and easily adapted for different brake capacity requirements that may be set by other standards or regulations.

It may be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of performing a brake capacity test on a brake system provided on a machine having a hydrostatic drive with a hydrostatic pump, the method comprising:
    initiating the brake capacity test when a test brake of the brake system is in an actuated position;
    determining a hydrostatic drive target differential pressure range;
    determining a machine ground speed limit;
    determining a hydrostatic drive actual differential pressure;
    determining an actual ground speed of the machine;
    modulating an output pressure of the hydrostatic pump to drive the hydrostatic drive actual differential pressure toward the hydrostatic drive target differential pressure range;
    determining a first test fault condition when the actual ground speed exceeds the machine ground speed limit; and
    determining a second test fault condition when the hydrostatic drive actual differential pressure is outside the hydrostatic drive target differential pressure range.

2. The method of claim 1, further comprising:
    initiating a timer for measuring a test period; and
    determining a test pass condition when the hydrostatic drive actual differential pressure is maintained within the hydrostatic drive target differential pressure range during the test period.

3. The method of claim 1, further comprising:
    initiating a timer for measuring a test period; and
    determining a third test fault condition when the hydrostatic drive actual differential pressure fails to reach the hydrostatic drive target differential pressure range within the test period.

4. The method of claim 1, further comprising:
    determining a hydrostatic drive maximum differential pressure greater than the hydrostatic drive target differential pressure range; and
    decreasing the output pressure when the hydrostatic drive actual differential pressure exceeds the hydrostatic drive maximum differential pressure.

5. The method of claim 1, in which the hydrostatic drive includes a forward line fluidly communicating with an outlet of the hydrostatic pump and a reverse line fluidly communicating with an inlet of the hydrostatic pump, and in which determining the hydrostatic drive actual differential pressure comprises comparing a forward pressure in the forward line with a reverse pressure in the reverse line.

6. The method of claim 1, in which the machine includes an engine operating at an engine speed, the method further comprising:
    determining a minimum engine speed;
    determining an actual engine speed; and
    exiting the brake capacity test when the actual engine speed is less than the minimum engine speed.

7. The method of claim 1, in which the hydrostatic drive includes a hydraulic oil having an oil temperature, the method further comprising:
   determining a minimum oil temperature;
   determining an actual oil temperature; and
   exiting the brake capacity test when the actual oil temperature is less than the minimum oil temperature.

8. The method of claim 1, in which the hydrostatic drive further includes a selector movable between a neutral position and a non-neutral position, the method further comprising initiating the brake capacity test only when the selector is in the non-neutral position.

9. The method of claim 1, in which the test brake comprises a service brake having a service brake control movable between a released position and an actuated position, the method further comprising determining a position of the service brake control, initiating the brake capacity test only when the service brake control is in the actuated position, and exiting the brake capacity test when the service brake control is in the released position.

10. The method of claim 1, in which the test brake comprises a parking brake having a parking brake control movable between a released position and an actuated position, the method further comprising determining a position of the parking brake control, initiating the brake capacity test only when the parking brake control is in the actuated position, and exiting the brake capacity test when the parking brake control is in the released position.

11. The method of claim 1, in which the hydrostatic drive target differential pressure range is based on a test torque associated with the machine.

12. The method of claim 8, further comprising exiting the brake capacity test when the selector is moved from the non-neutral position to the neutral position.

13. The method of claim 9, in which the machine further includes a second brake system comprising a parking brake having a parking brake control movable between a released position and an actuated position, the method further comprising determining a position of the parking brake control, initiating the brake capacity test only when the parking brake control is in the released position, and exiting the brake capacity test when the parking brake control is in the actuated position.

14. The method of claim 10, in which the machine further includes a second brake system comprising a service brake having a service brake control movable between a released position and an actuated position, the method further comprising determining a position of the service brake control, initiating the brake capacity test only when the service brake control is in the released position, and exiting the brake capacity test when the service brake control is in the actuated position.

15. The method of claim 11, in which the test torque is based a mass of the machine and test conditions identified in ISO 3450.

* * * * *